United States Patent [19]

Fleener et al.

[11] Patent Number: 5,375,880

[45] Date of Patent: Dec. 27, 1994

[54] AUTOMATIC AIR BAG CONTROLLER

[76] Inventors: Alfred C. Fleener, 320 W. Kirk St., Hartford, Ky. 42347; Kelly G. Fleener, 159 Elm Dr., Beaver Dam, Ky. 42320

[21] Appl. No.: 49,416

[22] Filed: Apr. 20, 1993

[51] Int. Cl.⁵ .............................................. B62D 9/02
[52] U.S. Cl. .................................. 280/772; 280/712; 280/714
[58] Field of Search ............... 280/714, 711, 712, 678, 280/707, 683, 772, 689

[56] References Cited

U.S. PATENT DOCUMENTS

| | | | |
|---|---|---|---|
| 2,844,384 | 7/1958 | Jackson | 280/711 |
| 2,901,241 | 8/1959 | Lautzenhiser | 280/772 |
| 3,494,632 | 2/1970 | Bostrom | 280/633 |
| 3,608,925 | 9/1971 | Murphy | 280/707 X |
| 4,555,126 | 11/1985 | Ishimitsu et al. | 280/714 |
| 4,558,886 | 12/1985 | Straub | 280/711 |
| 4,733,876 | 3/1988 | Heider et al. | 280/712 X |
| 4,865,148 | 9/1989 | Marumoto et al. | 280/714 X |
| 4,944,526 | 7/1990 | Eberling | 280/714 X |
| 5,016,910 | 5/1991 | Nagai | 280/201 |
| 5,052,713 | 10/1991 | Corey et al. | 280/711 |
| 5,066,041 | 10/1991 | Kindermann et al. | 280/772 |
| 5,096,219 | 3/1992 | Hanson et al. | 280/772 X |

FOREIGN PATENT DOCUMENTS

| | | |
|---|---|---|
| 3827807 | 2/1989 | Germany . |
| 0111511 | 4/1989 | Japan ........................ 280/222 |
| 869984 | 6/1961 | United Kingdom . |
| 2237780 | 5/1991 | United Kingdom . |
| 9107291 | 5/1991 | WIPO . |
| 9212021 | 7/1992 | WIPO . |

*Primary Examiner*—Kenneth R. Rice
*Assistant Examiner*—Christopher P. Ellis
*Attorney, Agent, or Firm*—Richard C. Litman

[57] ABSTRACT

A system for automatically operating a dump valve regulating inflation of pneumatic suspension members of a trailer suspension. The novel system adjusts pneumatic pressure of rear axle suspension members of a loaded trailer to facilitate maneuvering the rig at low speeds. The novel system is responsive to selection of low side transmission gears, as detected by monitoring pressure of the shifter pneumatic system, and to operation of a turn signal. When both a turn signal is detected, and when a low side gear is selected, thus assuring that the rig is operating at a low road speed, the dump valve vents pressure from selected pneumatic suspension members, An adjustable time delay feature causes the pneumatic system to be repressurized by deactivating the dump valve after a predetermined time period elapses, Apparatus monitoring steering linkage detects maneuvering, which activates the system when a low side gear is engaged even if the rig operator has neglected to operate the turn signals.

16 Claims, 2 Drawing Sheets

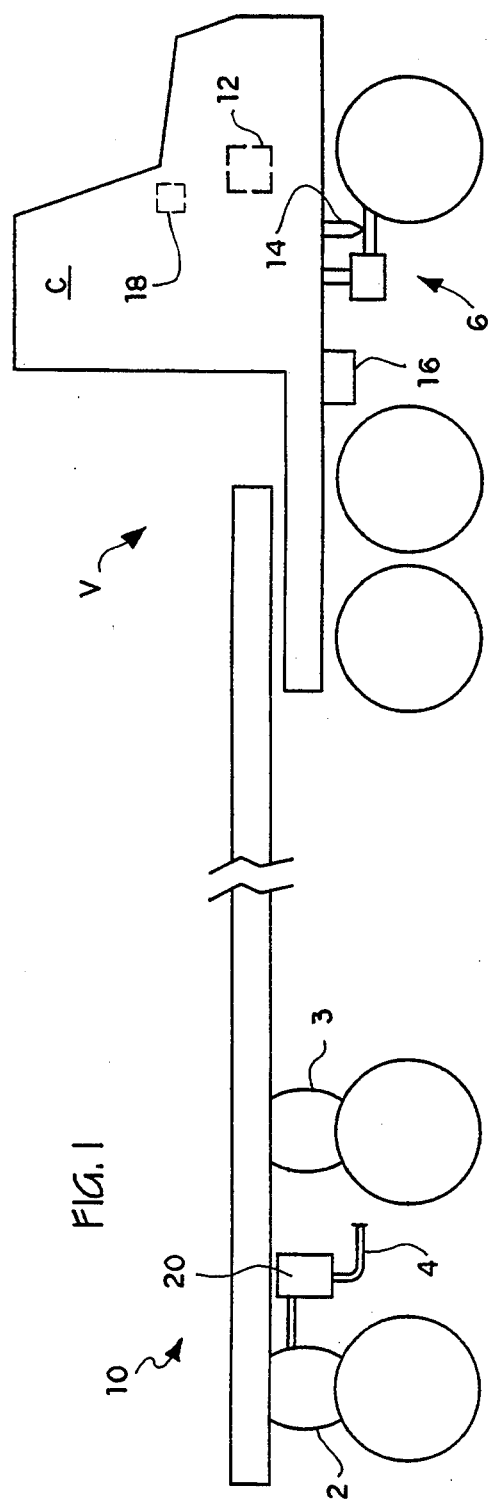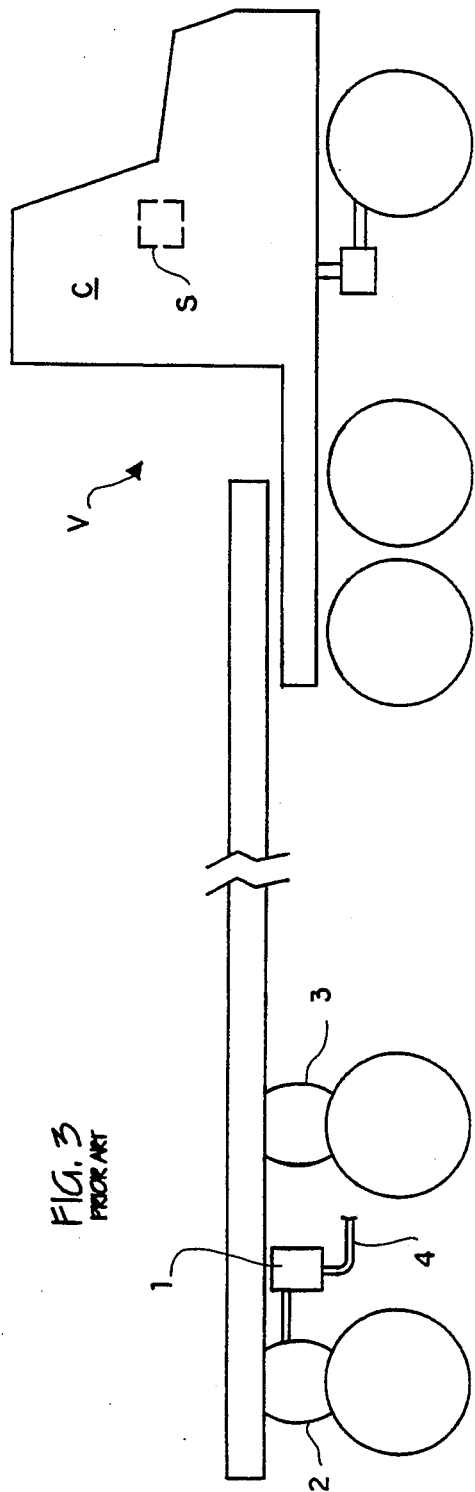

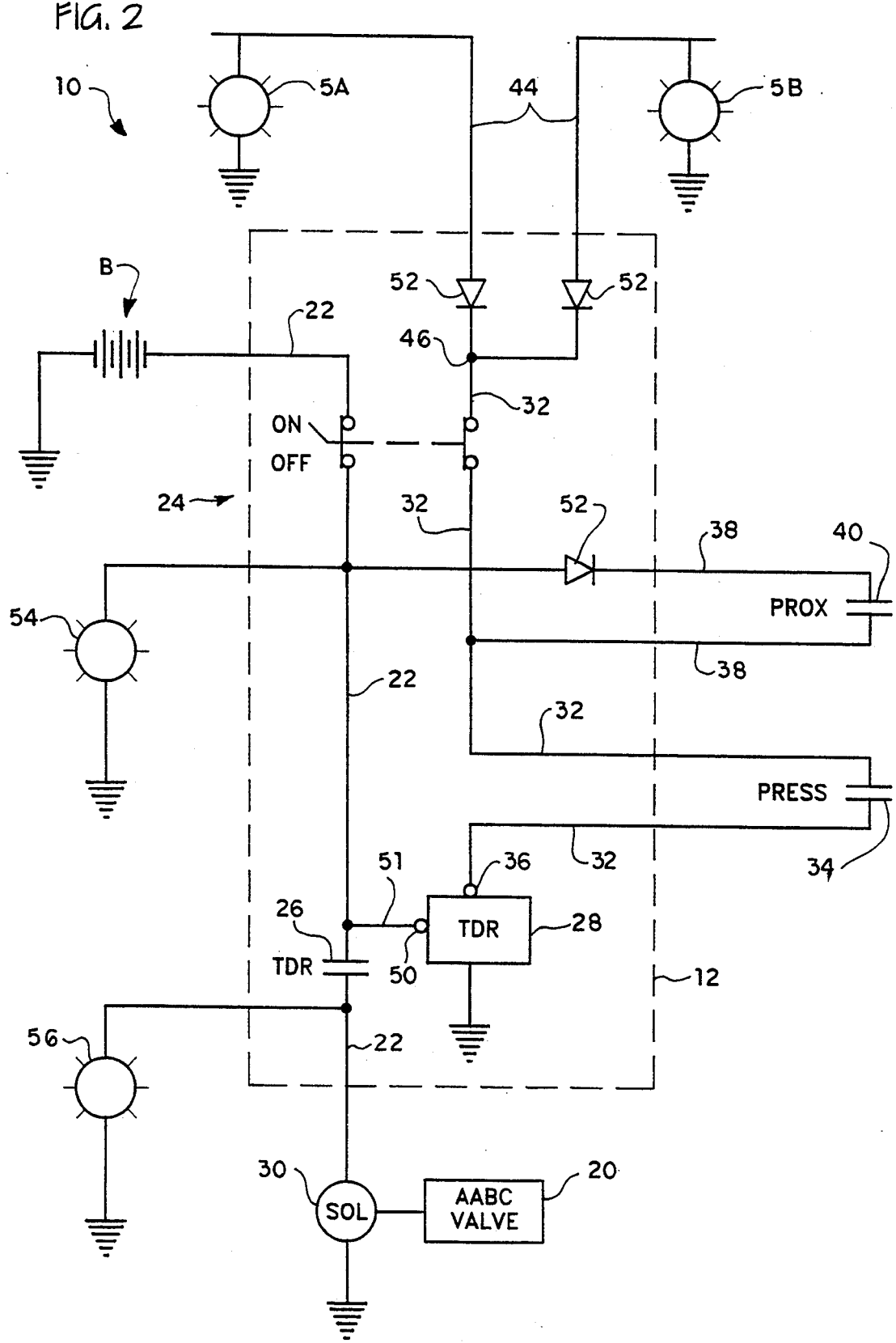

AUTOMATIC AIR BAG CONTROLLER

BACKGROUND OF THE INVENTION

1. Field of the Invention

The present invention relates to apparatus providing automated operation of a dump valve for regulating inflation of vehicle suspension pneumatic members.

2. Description of the Prior Art

The present invention provides apparatus for automatically operating a dump valve on a motor vehicle, typically a tractor and trailer combination, having inflated, load bearing pneumatic members. The dump valve deflates and inflates the pneumatic members. Unlike pneumatic members such as gas struts and shock absorbers, the pneumatic members to which the present invention pertains are air filled bladders which serve as shock dampers, pneumatic springs, and as chassis levelers. For purposes of brevity, to distinguish other pneumatic members, and due to descriptive accuracy, these pneumatic members will be termed air bags hereinafter.

In conventional practice, a vehicle is operated with the air bags inflated, since this arrangement properly distributes the load in accordance with axle capacity and braking considerations. To facilitate maneuvering in close quarters, the rearmost axle air bags are deflated, enabling the vehicle to pivot about the remaining axle, and to shorten the wheelbase of the vehicle. This practice is acceptable for low speed maneuvering, but the original condition must be restored for general operation of the vehicle.

It has become general practice to equip such vehicles with switch operated by the driver, which switch opens and closes solenoid operated valve connected to the pneumatic system. Air is vented from the selected air bags when the valve is open, and maintained within the air bags when the valve is closed. When closed, the air supply system of the vehicle will restore initial air pressure.

Systems for automating operation of a dump valve have been proposed, and are exemplified by U.S. Pat. No. 5,052,713, issued to Jeffrey S. Corey et al. on Oct. 1, 1991. Corey et al. employ an electromagnetic proximity sensor to monitor vehicle speed by counting the number of lugs passing thereby in a known time period. Timing means are provided to override the speed input.

Further patents relating to height of a chassis on its suspension include U.S. Pat. No. 2,844,384, issued to George W. Jackson on Jul. 22, 1958; U.S. Pat. No. 2,901,241, issued to Argyle G. Lautzenhiser on Aug. 25, 1959; U.S. Pat. No. 4,555,126, issued to Ikuo Ishimitsu et al. on Nov. 26, 1985; U.S. Pat. No. 4,558,886, issued to Gerald J. Straub on Dec. 17, 1985; German Pat. Document No. 3827807; International Applications published under PCT, International Publication Nos. WO 91/07291 and WO 92/12021; and UK Pat. Document Nos. 869,984 and U.S. Pat. No. 2,237,780. These documents disclose apparatuses and practices common to fluid suspensions, but when taken either singly or in combination, are not seen to describe the instant invention as claimed.

SUMMARY OF THE INVENTION

The present invention is directed to a system which automatically releases air from rear axle air bags of a loaded truck or the like, and automatically restores pneumatic pressure thereafter. An integral timer maintains the system depressurized for an adjustable, predetermined time period, and then enables repressurization. If the condition triggering depressurization still exists, repressurization is deferred.

The novel system considers two criteria in deciding whether to depressurize, these being 1) road speed, and 2) intent to maneuver the vehicle. Since maneuvering requires steering, intent to maneuver is inferred from activation of the turn signal system. A backup input is taken from the steering mechanism of the vehicle, which activates the novel system should the driver neglect to use turn signals, or should the turn signal system be inoperative.

While the system will work well when the second criterion is determined from only one of the turn signal input and actual steering input, best results are obtained with both inputs. Reliance upon a turn signal enables depressurization to occur prior to attempts to maneuver the vehicle, while the backup input provides positive assurance that an input pertaining to the second criterion be present.

In still less complicated embodiments, the decision to open the dump valve may be based solely on road speed and solely upon a steering input.

An advantage of the present invention is that all operations are automatic; that is, while prior art systems applied to depressurizing to attain maneuverability ensure that repressurization occur, they generally fail to initiate depressurization, relying instead upon the vehicle operator for this function. A driver may fail to depressurize for numerous reasons, including being preoccupied with the actual maneuver, being forgetful, or being preoccupied with still another aspect of vehicle operation.

A second advantage of the present invention is that only two or three sensors are required to arrive at an appropriate decision to depressurize. Monitoring road speed eliminates false deployments of the dump valve at speed, since advantages of depressurizing rear axle pneumatic members accrue only at low speeds. And inappropriate deployments, such as temporary slowing or stopping, as for traffic lights, negotiating railway tracks, and other situations calling for low speed operation, do not solely determine deployment of the dump valve. Yet a combination of only two or three inputs yields the appropriate decision to deploy.

The nature of these inputs further uncomplicate the novel system. Reliance upon an existing turn signal current obviates the need for a special sensor or signal generating equipment. The backup input, based upon monitoring steering movement, adds only an electromagnetic sensor to the system. Monitoring steering components is preferable to the system of Corey et al., since the sensor of the latter must be located in a vulnerable and exposed location. A particular hazard is false readings due to the iron content of brake dust. The location and nature of an electromagnetic sensor in the present invention overcome these problems.

Road speed is inferred by monitoring which transmission gear is engaged. Since large tractors are typically provided with transmissions having plural pneumatic circuits, one circuit effecting low range shifts, it is possible to monitor pneumatic pressure at one point on the transmission to determine whether low road speed condition exists. An electrical signal is thus easily derived by a pressure switch having normally open contacts.

The present invention complies with the requirement in several states that a dump valve controller be inaccessible to a vehicle driver. However, indicator lights are provided in the vehicle cab to annunciate status of the novel controller.

An on-off switch governs general operation of the present invention. As employed herein, "general operation" signifies that the system as a whole is activated and therefore ready to assume its functions, or that the system is disconnected from necessary power and will not perform any of its intended functions.

Diodes are provided to prevent backpowering of components or systems external to the air bag controller. Backpowering refers to current which might flow from the controller to other connected but independent appliances, such as turn signals or a circuit providing power to both the novel controller and also to other devices.

The dump valve is controlled by an electrical signal derived from current passing through only two sets of contacts, arranged in series. The apparatus required to practice the instant invention is therefore very uncomplicated, can be based on long proven, reliable, readily available, commercial components and materials, and yet is highly effective.

Accordingly, it is a principal object of the invention to provide an air bag controller which is fully automatic in its operation.

A second important object of the invention is to provide an airbag controller which both initiates and terminates deflation of selected air bags, whereby the air bag inflation system repressurizes the deflated air bags after there is no need for a deflated condition.

Another important object of the invention is to provide an airbag controller which responds to a steering input and to a road speed input to decide to deflate and repressurize.

A further object of the invention is to provide an air bag controller which utilizes an actual steering condition as an input.

A still further object of the invention is to provide an air bag controller which employs an input utilizing an existing electrical signal from the vehicle.

Still another object of the invention is to provide an air bag controller which employs an input based upon monitoring a preexisting pressure source from the vehicle.

An additional object of the invention is to provide an air bag controller which is readily compatible with a standard dump valve and with a standard vehicle electrical system.

Still another object of the invention is to provide an air controller providing status annunciation to a vehicle driver.

Yet an additional object of the invention is to provide an air bag controller wherein sensors are located in protected areas on the vehicle.

A still further object of the invention is to provide an air bag controller which is arranged to preclude electrical currents from backpowering external electrical devices.

Yet another object is to provide an air bag controller general operation of which is manually controlled.

A still additional object is to provide an air bag controller which employs standard and readily available commercial materials and components in manufacturing.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a diagrammatic view showing location of the components of the present invention in their environment.

FIG. 2 is an electrical schematic, showing the control circuit of the invention.

FIG. 3 is a diagrammatic view of the prior art.

Similar reference characters denote corresponding features consistently throughout the attached drawings.

DETAILED DESCRIPTION OF THE PREFERRED EMBODIMENTS

The present invention comprises a control system 10 for governing a dump valve 1 which regulates inflation of vehicle air bags 2, these conventional components being seen in FIG. 3. Air bags 3 are not controlled by dump valve 1, and consequently remain inflated. Dump valve 1 is controlled by a switch S located in the driver's cab C of a vehicle V. Dump valve 1 is constantly supplied with pressurized air, represented by supply line 4, controlled by a levelling valve (not shown) carried on vehicle V.

In the present invention, as seen in FIG. 1, switch S has been deleted from vehicle V, and superseded by control system 10. Control system 10 comprises an enclosure 12 housing controls further described later, enclosure 12 hereinafter being referred to as control box 12; a steering linkage sensor 14 monitoring steering linkage 6; and a transmission pneumatic pressure sensor 18. In a preferred embodiment, an annunciator panel 18 is located in cab C.

System operation is understood with reference to FIG. 3. Dump valve 1, which is referred to in the present invention as automatic air bag control (AABC) valve 20, derives a conventional electrical operating signal from a power circuit 22. Power circuit 22 obtains power from the vehicle battery B or from any convenient circuit connected thereto, and is switched at two points within the present control system 10. The first point is an on-off switch 24 located on control box 12, to activate or deactivate general operation. A second point is a set of normally open contacts 26 switched by a time delay relay TDR 28, of any well known type, which set of contacts 28 provides the automatic signal controlling AABC valve 20. When both switches 24 and 28 are closed, current flows to AABC solenoid 30, which operates AABC valve 20, thus venting air from air bags 2.

A control circuit 32 provides a signal activating TDR 28. This signal will energize TDR 28, thus operating AABC solenoid 30. This control signal is obtained when the following condition is met. When any one of three steering input signals is obtained, and transmission pressure sensor 16 recognizes operative pressure and closes normally open contacts PRESS 34, continuity in the control circuit 32 is provided, enabling power to flow to a signal input terminal 36 on TDR. It will be understood that steering linkage sensor 14 and pressure sensor 16 each includes a set of electrical contacts 40 or 34, respectively, and is connected to the balance of the control system 10 by conductors shown in the schematic diagram of FIG. 2.

The three steering input signals include a signal originating at power circuit 22 and providing current to a control subcircuit 38 extending through normally open contacts PROX 40 of steering linkage sensor 14, which comprises an electromagnetic proximity sensor, and either turn signal 5A or 5B. As described above, any one steering input signal in combination with closure of transmission pressure responsive contacts PRESS 34 will close main power contacts 26.

Because conductors 44 connected to both of the turn signal lamps are connected at junction 46, either turn signal will furnish a signal to control circuit 32. Likewise, steering linkage sensor contacts 40 are connected at junction 48 to control subcircuit 32, and, therefore, any one of three steering signals, subject to being overridden by on-off switch 24, will enable a signal current to flow to contacts 34, and then to signal input terminal 36.

Power circuit 22, extending to AABC solenoid 30 when closed, is maintained closed for a predetermined time interval by TDR 28. TDR 28 is prevented from cycling on and off by deriving a constant source of power from connection of power subcircuit 22 to TDR power input terminal 50 at conductor 51. If deployment conditions still prevail as described above, TDR 28 will again close power circuit 22 to AABC solenoid 30 for another cycle of operation.

TDR 28 and associated contacts 26 and terminals 36 and 50, and partial power and control circuits 22 and 32 are contained within control box 12, indicated in broken line. Also included in control box 12 are diodes 52, which prevent back powering of other electrical devices connected thereto.

Indicating lamps 54,56 are located on annunciator panel 18. Ready lamp 54 indicates that on-off switch 24 is set to "on". Second lamp 56 indicates that power is being supplied to AABC solenoid 30, and that air bags 2 are depressurized. This is a useful feature in helping the driver to determine whether TDR 28 has timed out following a deployment cycle, and whether airbags 2 have been repressurized.

The present control system 10 is also operable in those cases wherein turn signals 5 operate on power of different characteristics than power circuit 22 by appropriate incorporation of interposing relays (not shown), as is well understood in the art.

The control system 10 thus described monitors three variables and needs signal inputs from only two of those three variables to deploy. Deployment continues for a preset time period. Then, the control system 10 deactivates if conditions allow. The control system 10 requires relatively few components, all well known and commercially available, to provide an uncomplicated, logical, and fully automatic system to control air bag deflation and reinflation.

It is to be understood that the present invention is not limited to the embodiments described above, but encompasses any and all embodiments within the scope of the following claims.

We claim:

1. For use with a motor vehicle having a steering system including steering linkage, a turn signal system including at least one turn signal, air bags, and at least one dump valve controlling selected air bags:

automatic air bag controller means for operating the at least one dump valve, said air bag controller means comprising:

means for detecting low road speed mounted on the motor vehicle, and for generating a first signal responsive to actual detection of low road speed;

means for detecting intended maneuvering of the motor vehicle, and for generating a second signal responsive to actual detection of intended maneuvering, said means comprising means for monitoring the at least one turn signal of the motor vehicle, and said means mounted on the motor vehicle;

means for operating the at least one dump valve controlling the selected air bags, said dump valve operating means mounted on the motor vehicle and responsive to said first and second signals responsive to actual detection of low road speed and intended maneuvering, respectively.

2. Automatic air bag controller means according to claim 1, said means for monitoring turn signals comprising:

electrical connection means conducting an electrical turn signal current from the vehicle turn signal system to said air bag controller means; and means responsive to electrical turn signal current for initiating a signal for operating the dump valve.

3. Automatic air bag controller means according to claim 1, said means for detecting intended maneuvering comprising means for detecting actual maneuvering.

4. Automatic air bag controller means according to claim 3, said means for detecting actual maneuvering comprising sensor and electrical contact means mounted proximate the steering linkage and detecting steering motion thereof.

5. Automatic air bag controller means according to claim 4, said means for detecting steering motion of steering linkage comprising an electromagnetic proximity sensor.

6. Automatic air bag controller means according to claim 1, for use with a motor vehicle further including a transmission having a plurality of selectable gears including a lower gear range and an upper gear range, and fluid pressure operated shifting apparatus, wherein one fluid pressure circuit operates only the lower gear range, said means for detecting low road speed comprising:

means for detecting operative fluid pressure in the fluid pressure circuit operating the lower gear range, and generating a signal responsive to actual detection of operative fluid pressure therein; and means responsive to said signal responsive to detection of actual operative fluid pressure.

7. Automatic air bag controller means according to claim 1, further including switch means for controlling general operation.

8. For use with a motor vehicle having a steering system including steering linkage, a turn signal system including at least one turn signal, air bags, and at least one dump valve controlling selected air bags:

automatic air bag controller means for operating the at least one dump valve, said air bag controller means comprising:

means for detecting intended maneuvering of the motor vehicle, and for generating a signal responsive to actual detection of intended maneuvering, said means comprising means for monitoring turn signals; and means for operating at least one dump valve controlling the selected air bags responsive to said signal responsive to actual detection of intended maneuvering.

9. Automatic air bag controlling means according to claim 8, said means for monitoring turn signals comprising:

electrical connection means conducting an electrical turn signal current from the motor vehicle turn signal system to said air bag controller means; and means responsive to electrical turn signal current for generating an input signal to said automatic air bag controller means.

10. Automatic air bag controlling means according to claim 5, said means for detecting intended maneuvering comprising means for detecting actual maneuvering.

11. Automatic air bag controlling means according to claim 10, said means for detecting actual maneuvering comprising means mounted proximate the steering linkage and detecting steering motion thereof.

12. Automatic air bag controlling means according to claim 11, said means for detecting steering motion of steering linkage comprising electromagnetic proximity sensor means.

13. Automatic air bag controlling means according to claim 8, for use in a vehicle further including at least one external electrical system, said automatic air bag controller means further including means for preventing backpowering of the external vehicle electrical system.

14. Automatic air bag controlling means according to claim 8, further comprising switch means for controlling general operation.

15. Automatic air bag controlling means according to claim 1, further comprising:

an annunciator panel, said annunciator panel including a first and second indicator means;

said first indicator means being responsive to said switch means for controlling general operation, whereby an operator of the vehicle can determine whether said automatic air bag controller means is activated or deactivated; and said second indicator means being responsive to said dump valve operating means, whereby the operator of the motor vehicle can determine whether the air bags of the motor vehicle are pressurized or depressurized.

16. Automatic air bag controlling means according to claim 8, further comprising:

an annunciator panel, said annunciator panel including a first and second indicator means;

said first indicator means being responsive to said switch means for controlling general operation, whereby an operator of the vehicle can determine whether said automatic air bag controller means is activated or deactivated; and said second indicator means being responsive to said dump valve operating means, whereby the operator of the motor vehicle can determine whether the air bags of the motor vehicle are pressurized or depressurized.

\* \* \* \* \*